US006921997B2

United States Patent
Chen et al.

(10) Patent No.: US 6,921,997 B2
(45) Date of Patent: Jul. 26, 2005

(54) ACTIVE MAGNETIC BEARING WITH IMPROVED CONFIGURATION REFERENCE CITED

(75) Inventors: Shyh-Leh Chen, Keeling (TW); Chan-Tang Hsu, Changhua (TW)

(73) Assignee: National Chung Cheng University, Chin-Yi (TW)

( * ) Notice: Subject to any disclaimer, the term of this patent is extended or adjusted under 35 U.S.C. 154(b) by 0 days.

(21) Appl. No.: 10/326,075

(22) Filed: Dec. 23, 2002

(65) Prior Publication Data

US 2004/0119355 A1 Jun. 24, 2004

(51) Int. Cl.$^7$ ............................................. H02K 7/09
(52) U.S. Cl. ........................... 310/90.5; 310/166
(58) Field of Search ............................. 310/90.5, 166; 219/647; 324/151; 361/139, 143

(56) References Cited

U.S. PATENT DOCUMENTS

| | | | | |
|---|---|---|---|---|
| 5,522,694 | A | * | 6/1996 | Bernhardt et al. ......... 310/90.5 |
| 6,114,788 | A | * | 9/2000 | Vuillemin (Muller) et al. .. 310/90.5 |
| 6,359,356 | B1 | * | 3/2002 | Hayashi ..................... 310/90.5 |
| 6,365,996 | B2 | * | 4/2002 | Schob ....................... 310/90.5 |
| 6,717,311 | B2 | * | 4/2004 | Locke ....................... 310/90.5 |

FOREIGN PATENT DOCUMENTS

| | | | | | |
|---|---|---|---|---|---|
| DE | 10019761 | A | | 4/2000 | |
| JP | 61171918 | A | * | 8/1986 | ........... F16C/32/04 |
| JP | 01098708 | A | * | 4/1989 | ........... H02K/7/09 |
| JP | 01248939 | A | * | 10/1989 | ........... H02K/7/09 |
| JP | 06313425 | A | * | 11/1994 | ........... F16C/32/04 |
| JP | 2002089559 | A | * | 3/2002 | ........... F16C/32/04 |

OTHER PUBLICATIONS

"Effect of Magnetic Pole Arrangement on Core Loss in Laminated High–Speed Magnetic Journal Bearings", IEEE Transactions on Magnetics, vol. 32, No. 4, Jul. 1996, pp. 3246–3252.

* cited by examiner

Primary Examiner—Tran Nguyen
Assistant Examiner—J. Aguirrechea
(74) Attorney, Agent, or Firm—Troxell Law Office, PLLC

(57) ABSTRACT

The present invention provides an active magnetic bearing (AMB) with improved configuration. The active magnetic bearing includes a stator which possesses only three magnetic poles. The three magnetic poles are arranged radially with an equiangular degree along an internal circumference of the stator and not in the same semicircle. Each of the magnetic poles is equipped with an individual power amplifier for providing coil current. In the other way, two of the magnetic poles can be equipped with only one power amplifier, and the other magnetic pole is equipped with an individual power amplifier so as to reduce the number of the power amplifiers.

1 Claim, 3 Drawing Sheets

ACTIVE MAGNETIC BEARING WITH IMPROVED CONFIGURATION REFERENCE CITED

REFERENCE CITED

1. U.S. Pat. No. 6,359,356
2. Germany patent Number: DE10019761

BACKGROUND OF THE INVENTION

1. Field of the Invention

The present invention is related to an active magnetic bearing (AMB) with improved configuration, and more particularly, to an active magnetic bearing with improved configuration which possesses only three magnetic poles.

2. Description of the Prior Art

Since the modern industry requires high manufacturing rate, the manufacturing equipments also need to be improved toward to high speed in the future. However, the increase of revolution velocity of the rotor is limited because a typical bearing needs to contact with other machine elements when it rotates. The magnetic bearing does not contact with other machine elements in rotating and hence can overcome the limitations of revolution velocity. Although the development potential of the active magnetic bearing is generally approved by researchers and manufacturers, it still cannot be widely applied in industry because of its high prices. Therefore, how to reduce cost of the active magnetic bearing becomes an important issue.

When the rotor of the magnetic bearing rotates in high speed, many factors can affect the operation, such as eccentric mass, contact force, external disturbance, system nonlinearity, and rotor flexibility. These factors are in proportion of the revolution velocity of the rotor. Proper control is thus necessary for the magnetic bearing. A magnetic bearing with eight magnetic poles and high bias current is commonly used to reduce the magnetic coupling problems, and to make the system easier to control. However, high bias current will lead to large heat dissipation caused by coil resistance.

Further, the magnetic bearing with eight magnetic poles typically needs four power amplifiers to provide coil currents. Two adjacent magnetic poles form a magnetic loop, and four independent magnetic loops are respectively located on four directions of the x axis and the y axis so as to produce four direction magnetic forces which are uncoupled to each other. This configuration makes the controller easier to design. However, each pair of magnetic poles needs to be assembled with one power amplifier, resulting in high cost of the active magnetic bearing with eight magnetic poles.

In order to reduce the number of the power amplifiers and the overall cost, differential winding method can be used in the magnetic bearing with eight magnetic poles to make two opposite pairs of magnetic poles which are on the same axis equipped with one power amplifier It needs one more bias current coil to wind on the two pairs of magnetic poles. The bias current coil is independent of the control current coil which is electrically connected with the power amplifier. However, these two independent coils make heat induced by resistance increase rapidly. Therefore, in order to prevent permeability decreasing caused by high temperature, and affecting the control of the active magnetic bearing, a cooling system is further needed to solve these problems. Therefore, differential winding method cannot actually reduce the cost of the active magnetic bearing.

In order to improve the high cost of the active magnetic bearing, the number of the magnetic poles can be reduced to three since only three power amplifiers will be needed. FIG. 3 is schematic diagram showing a structure of a conventional three-pole active magnetic bearing. It assumes uniform spaces between the rotor and the three pole teeth, and the commonly used three-phase current control circuit for motor control is employed. However, the assumption of uniform air gaps is valid only when the rotor displacements are small. Consequently, the controllable range of the rotor displacements is small. In practice, the rotor displacements can be large during operation. Therefore, the conventional three-pole active magnetic bearing is not practical. In fact, the three-pole active magnetic bearing suffers the problem of magnetic coupling, and hence the system dynamics are strongly nonlinear. Specifically, the magnetic forces depend nonlinearly on the rotor displacements and control currents. Therefore, a nonlinear controller is necessary to enlarge the controllable range of the rotor displacements.

Further, the orientation of the three pole teeth affects the control currents flowing the windings on the three poles, and also affects the number of required power amplifiers. Note that heat dissipation depends on the control currents. When the gravity is in the vertical direction, the magnetic bearing needs to support the rotor weight. In this case, the conventional three-pole active magnetic bearing with one pole tooth on the horizontal direction and with three-phase control currents cannot result in minimum heat dissipation. However, without using the three-phase control currents, the number of required power amplifiers must be three.

SUMMARY OF THE INVENTION

The present invention intends to provide a three-pole type configuration of the active magnetic bearing with lower requirement of power amplifiers, lower iron loss of the rotor, and lower heat induced by resistance so as to solve the cost and the heat dissipation problems of the prior art. The present invention is a nonlinear system with magnetic coupling problems, so that a nonlinear controller is needed in the present invention. Since nonlinear control theory and PC/DSP-Based control technology are well developed nowadays, the design of the nonlinear controller is no longer a problem.

In one embodiment of the present invention, an active magnetic bearing with improved configuration (AMB) is provided. The active magnetic bearing includes a stator which possesses only three magnetic poles. The three magnetic poles are arranged radially with an equiangular degree along an internal circumference of the stator. Each of the magnetic poles is equipped with an individual power amplifier for providing coil current.

In another embodiment of the present invention, two of the magnetic poles can be wound by coils in opposite direction and are equipped with only one power amplifier, and the other magnetic pole is equipped with an individual power amplifier.

It is an advantage of the present invention that the number of the power amplifiers can be reduced. The iron loss in the rotor is also reduced due to the smaller remagnetization frequency. Finally, reduction of the pole number leaves more space for heat dissipation, sensor installation, and the increase of pole face area and coil turns to lower down coil current, resulting in lower copper loss. All of the above advantages can lead to lower cost and less heat loss for the active magnetic bearing.

This and other objectives of the present invention will no doubt become obvious to those of ordinary skill in the art

DETAILED DESCRIPTION OF THE PREFERRED EMBODIMENT

Figure 1:
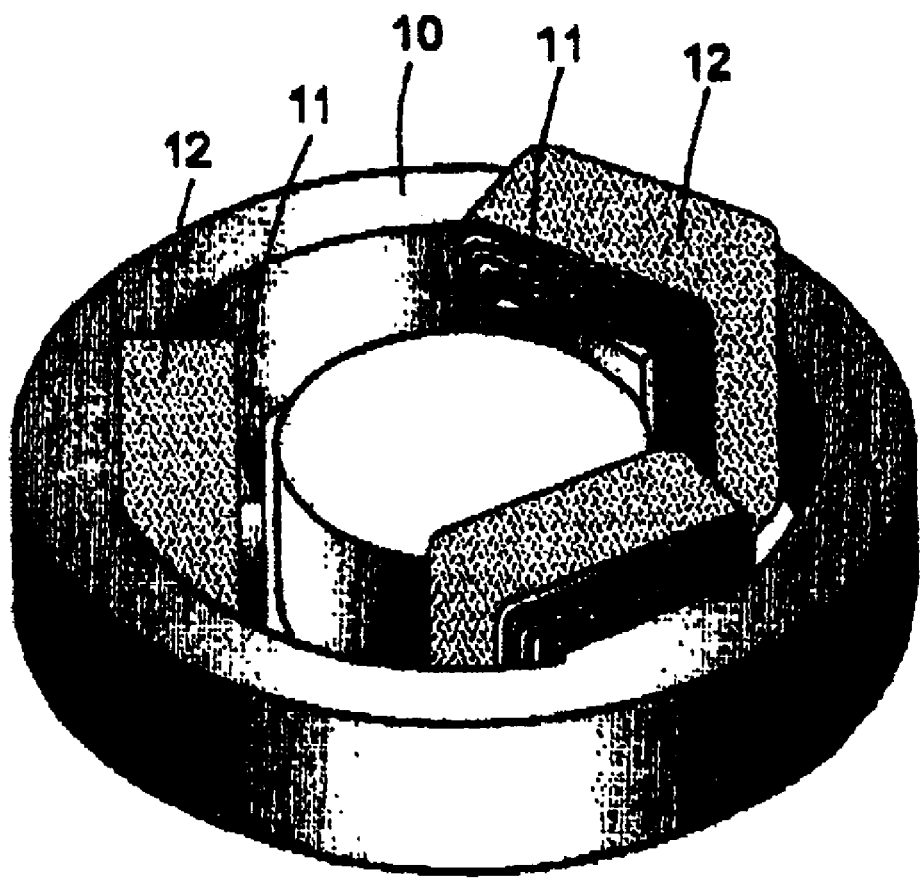
FIG. 1 is a perspective view showing a three-pole active magnetic bearing according to the present invention.

Please refer to FIG. 1. It is a schematic diagram of a stator 10 in an active magnetic bearing (AMB) according to the present invention. As shown in FIG. 1, an improved configuration of the active magnetic bearing in the present invention includes a stator 10. The stator 10 is made of magnetic materials and has three magnetic poles 11 arranged radially along an internal circumference of the stator 10, but the three magnetic poles 11 are not disposed in the same semicircle of the internal circumference of the stator 10. Each of the three magnetic poles 11 is wound by a coil 12, and is equipped with an individual power amplifier 20. In this embodiment of the present invention, only three power amplifiers 20 are needed to be disposed in the active magnetic bearing, and without large bias current coils in it, so that problems of heat dissipations induced by resistance can be solved. Since lower coil currents lead to lower copper loss, the cost of manufacture can be lowered down. Furthermore, nonlinear controller is used in the present invention to allow for low bias currents and large controllable range of the rotor displacements during operation.

Figure 2:
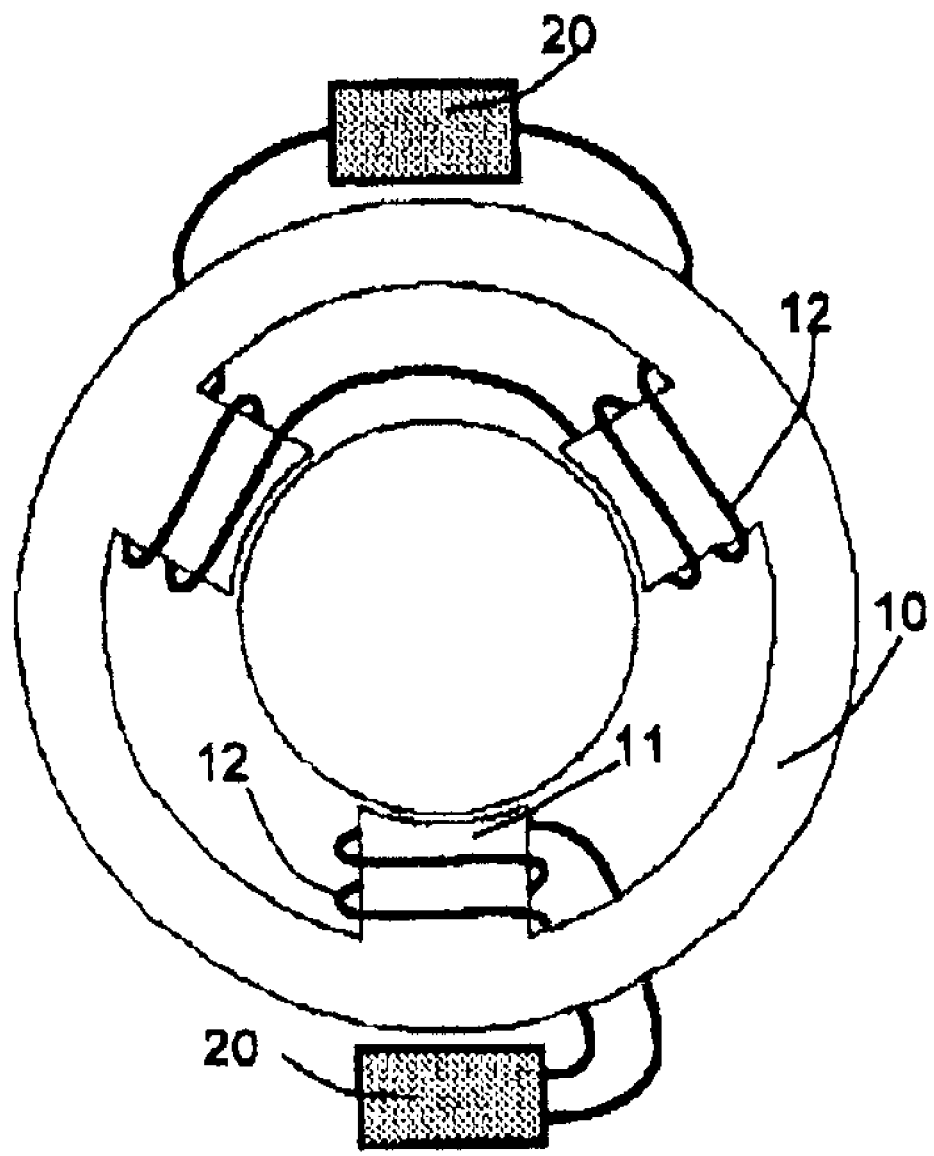
FIG. 2 is a schematic diagram of a three-pole active magnetic bearing according to the present invention.
Figure 3:
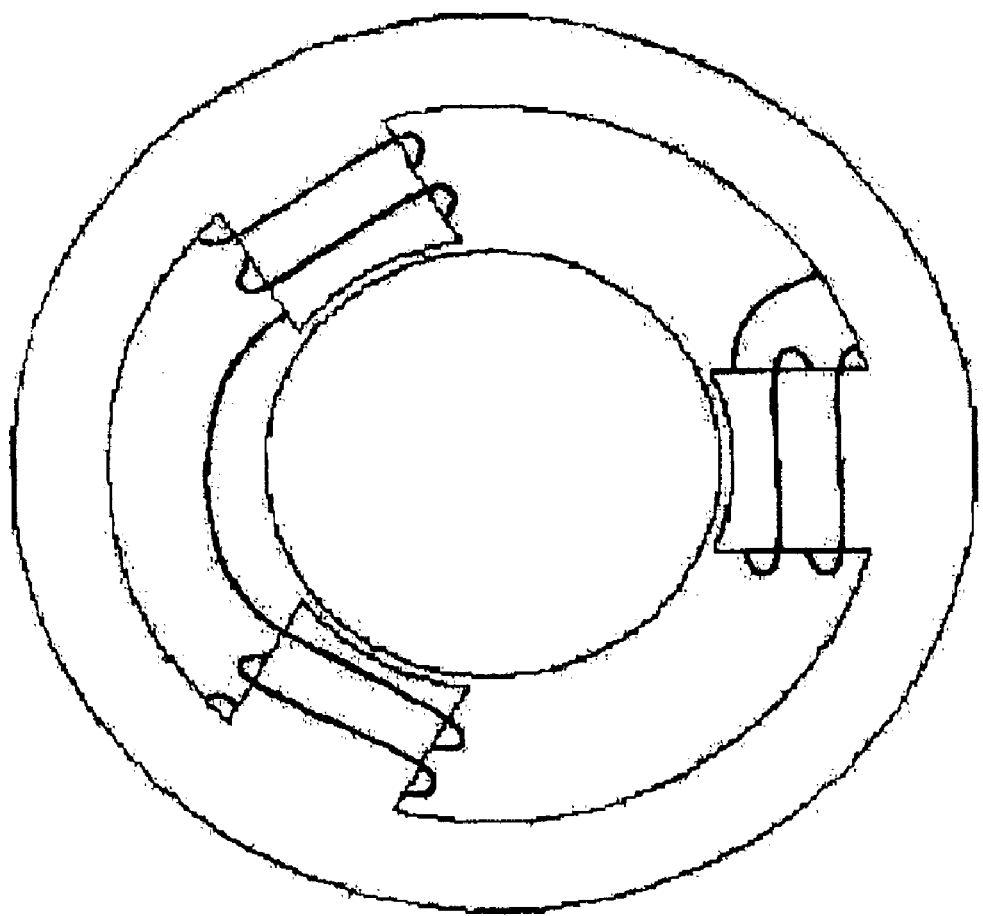
FIG. 3 is a schematic diagram showing a structure of a conventional three-pole active magnetic bearing.

Using the same equipments as the aforementioned embodiment, and without extra element, another improved configuration of the stator 10 in the active magnetic bearing can be easily attained. In a preferred embodiment of the present invention, one power amplifier 20 is further saved without affecting the control of the active magnetic bearing, or increasing heat dissipations induced by resistance even when the rotor needs to be supported by the active magnetic bearing. Furthermore refer to FIG. 2, which shows the stator 10 in the active magnetic bearing according to the present invention. As shown in FIG. 2, which three magnetic poles 11 are arranged with an equiangular degree along an internal circumference of the stator 10. The equiangular degree between each two of the magnetic poles 11 is 2n divided by 3. Each of the magnetic poles 11 is wound by coils 12, wherein two of the coils 12 wound on two of the magnetic poles 12 are in opposite direction and then electrically connected together to one of the power amplifiers 20, and the other coil 12 is electrically connected to an individual power amplifier 20. Therefore, only two power amplifiers 20 are needed in this embodiment for receiving input signals and providing magnetic power to control the position of the rotor. When the rotor needs to be supported by the active magnetic bearing, the preferred active magnetic bearing is rotated to make the magnetic pole 11 which is electrically connected to the individual power amplifier 20 under the other two magnetic poles 11, and perpendicular to the horizontal. That is, the magnetic pole 11 which is electrically connected to the individual power amplifier 20 and the other two magnetic poles 11 which are electrically connected together by coils 12 forms into a Y shape. Then the heat dissipations induced by resistance can be well reduced.

Compared with the commonly used eight-pole type or conventional three-pole type active magnetic bearing of the prior art, the configuration in the present invention improves disadvantages of the prior art:

1. Requirement of the power amplifiers 20 are less than the prior art: in the first embodiment of the present invention, at least one power amplifier 20 can be saved since it requires at most three. In the preferred embodiment of the present invention, only two power amplifiers 20 are needed. Thus, the number of the power amplifiers and the cost can be lowered down.

2. The remagnetization frequency is lower: the frequency induced by variety of the magnetic field that each revolution of the rotor in the three-pole structure of the active magnetic bearing in the present invention suffers is only half of the eight-pole structure in the prior art. Therefore the three-pole structure in the present invention leads to lower iron loss than the prior art. Furthermore, the iron loss will be converted into heat energy, and since the iron loss is lower in the present invention, the effects of heat induced by the iron loss on permeability in the present invention can be reduced.

3. Copper loss is lower: nonlinear controller is used in the present invention to allow for low bias currents. The present invention prevents the problems of using high bias current in the prior art, resulting in lower copper loss.

4. The controllable range of the rotor displacements is larger: the spaces between the rotor and the three pole teeth are not assumed to be uniform. Nonlinear controller taking into account large rotor displacements is employed.

5. There is more space in the active magnetic bearing for disposing other means: the pole number is reduced in the present invention so as to leave more space in the internal of the stator 10. The extra space can be used to install sensors so as to prevent non-collocation problems, or can be used to increase both coil turns and the cross-sectional width of the magnetic pole so as to lower down coil current and the inherent heat dissipation.

6. The manufacturing time and cost are both reduced: the coil turns are decreased in the present invention, so that the manufacturing time and cost of the active magnetic bearing is correspondingly reduced.

Using the aforementioned description to dispose the active magnetic bearing can lead to lower cost and less heat loss. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An active magnetic bearing comprising:
   a) a stator having three magnetic poles, the three magnetic poles being first, second and third magnetic poles equally spaced around an internal circumference thereof;
   b) first and second amplifiers; and
   c) first, second and third coils, the first coil being wound around the first magnetic pole, the second coil being wound around the second magnetic pole, the third coil being wound around the third magnetic pole, the first coil and the second coil being wound in opposite directions around the first and the second magnetic poles respectively, the first amplifier being electrically connected between the oppositely wound first and second coils and the third coil being electrically connected to the second amplifier, wherein a first magnetic pole of the three magnetic poles that is wound by the first coil and a second magnetic pole of the three magnetic poles that is wound by the second coil are electrically connected to the first amplifier, and a third magnetic pole of the three magnetic poles that is wound by the third coil is electrically connected to the second amplifier.

* * * * *